US005505264A

United States Patent [19]
Morris et al.

[11] Patent Number: 5,505,264
[45] Date of Patent: Apr. 9, 1996

[54] LEATHER-LIKE HOOF PAD OF COMPOSITE MATERIAL

[75] Inventors: Larry E. Morris, Buena Vista; George A. Casper, Lexington; Charles R. Moran, Buena Vista, all of Va.

[73] Assignee: Georgia Bonded Fibers, Inc., Buena Vista, Va.

[21] Appl. No.: 167,087

[22] Filed: Dec. 16, 1993

[51] Int. Cl.$^6$ ....................................... A01L 7/02
[52] U.S. Cl. ................................. 168/12; 168/28
[58] Field of Search ....................... 168/12, 14, 28, 168/DIG. 1

[56] References Cited

U.S. PATENT DOCUMENTS

| | | |
|---|---|---|
| 9,173 | 8/1852 | Jones . |
| 78,050 | 1/1868 | Rust . |
| 80,819 | 7/1868 | Wetherell . |
| 89,775 | 5/1869 | Johnson . |
| 110,828 | 1/1871 | Corbin . |
| 133,549 | 12/1872 | Stickney . |
| 142,590 | 9/1873 | Smith . |
| 145,463 | 12/1873 | Todd . |
| 158,284 | 12/1874 | Kintzing et al. . |
| 167,600 | 9/1875 | Albright . |
| 180,532 | 8/1876 | Braffett et al. . |
| 246,928 | 9/1881 | Watts . |
| 257,500 | 5/1882 | Layden . |
| 304,516 | 9/1884 | Fenno . |
| 308,449 | 11/1884 | Wallace . |
| 371,789 | 10/1887 | Robertson . |
| 458,051 | 8/1891 | Hitch . |
| 479,912 | 8/1892 | Mooney . |
| 508,607 | 11/1893 | Edge . |
| 514,934 | 2/1894 | Jones . |
| 546,145 | 9/1895 | Gibbs . |
| 602,046 | 4/1898 | Hitch . |
| 620,878 | 3/1899 | Bauer . |
| 626,091 | 5/1899 | Peter et al. . |
| 646,029 | 3/1990 | Long . |
| 648,236 | 4/1990 | Bush . |
| 649,231 | 5/1900 | Winquist . |
| 651,372 | 6/1900 | McC. Lord . |
| 696,450 | 4/1902 | King . |
| 711,475 | 10/1902 | Conroy . |
| 723,889 | 3/1903 | McC. Lord . |
| 815,399 | 3/1906 | Anderson . |
| 822,949 | 6/1906 | Hubbard . |
| 841,031 | 1/1907 | Martins . |
| 846,082 | 3/1907 | Bellmann . |
| 849,080 | 4/1907 | Olcott . |
| 854,034 | 5/1907 | Handy et al. . |
| 878,730 | 2/1908 | Johnson et al. . |
| 942,012 | 11/1909 | Randall . |
| 948,245 | 2/1910 | Owens . |
| 1,075,199 | 10/1913 | Cruice . |
| 1,197,602 | 9/1916 | Cassidy . |
| 1,212,266 | 1/1917 | Schrader . |
| 1,612,577 | 12/1926 | Hall . |
| 1,673,650 | 6/1928 | Tweed ................................. 168/28 X |
| 1,698,415 | 1/1929 | Primmer . |
| 1,702,882 | 2/1929 | Tweed . |
| 1,709,509 | 4/1929 | Wernett ............................... 168/28 X |
| 1,966,458 | 6/1934 | Novak . |
| 1,995,844 | 3/1935 | Eichenauer .............................. 168/12 |

(List continued on next page.)

*Primary Examiner*—Robert P. Swiatek
*Attorney, Agent, or Firm*—Jacobson, Price, Holman & Stern

[57] ABSTRACT

A hoof pad adapted for attachment between the hoof of a horse and a horseshoe. The hoof pad is made of a leather-like composite material having a substantially continuous web portion impregnated with a binder composition. The web portion of the composite material is made of a particulate, matrix-forming material, preferably a natural or synthetic fibrous material. The binder composition binds the particulate, matrix-forming material in the web and imparts resiliency and water resistance to the composite material. Preferably, the binder composition is a natural or synthetic rubber latex. The hoof pad can be a full pad or a rim pad, and is sized to fit between a horse's hoof and a horseshoe with a peripheral portion shaped substantially the same as the arcuate portion of the horseshoe.

13 Claims, 1 Drawing Sheet

U.S. PATENT DOCUMENTS

| | | | |
|---|---|---|---|
| 2,022,687 | 12/1935 | Novak . | |
| 2,103,718 | 12/1937 | Goodwin | 168/12 |
| 2,107,304 | 2/1938 | Novak . | |
| 2,705,536 | 4/1955 | Phreaner | 168/14 |
| 3,285,346 | 11/1966 | Jenny et al. | 168/4 |
| 3,288,223 | 11/1966 | Ferguson | 168/12 |
| 3,490,536 | 1/1970 | Hourlier | 168/4 |
| 3,628,608 | 12/1971 | Sherman | 164/4 |
| 3,747,684 | 7/1973 | Wallen | 168/28 |
| 4,122,900 | 10/1978 | Barr et al. | 168/12 |
| 4,237,981 | 12/1980 | Stübbe | 168/4 |
| 4,513,825 | 4/1985 | Murphy | 168/12 |
| 4,565,250 | 1/1986 | Vasko | 168/12 |
| 4,605,071 | 8/1986 | McKibben | 168/12 |
| 4,691,782 | 9/1987 | Stine | 168/12 |
| 4,765,412 | 8/1988 | Colonel et al. | 168/15 |
| 4,775,011 | 10/1988 | McCuan | 168/12 |
| 4,823,883 | 4/1989 | Colonel et al. | 168/12 |
| 4,888,225 | 12/1989 | Sandvig et al. | 428/71 |
| 4,889,188 | 12/1989 | Anderson | 168/13 |
| 4,998,586 | 3/1991 | Fox et al. | 168/12 |
| 5,029,648 | 7/1991 | Stephens | 168/12 |
| 5,105,891 | 4/1992 | Noffsinger | 168/13 |
| 5,105,892 | 4/1992 | Seesholtz | 168/27 |
| 5,121,798 | 6/1992 | Lindh | 168/12 |
| 5,137,093 | 8/1992 | Stephens | 168/12 |
| 5,330,008 | 7/1994 | Sigafoos et al. | 168/12 |

U.S. Patent    Apr. 9, 1996    5,505,264
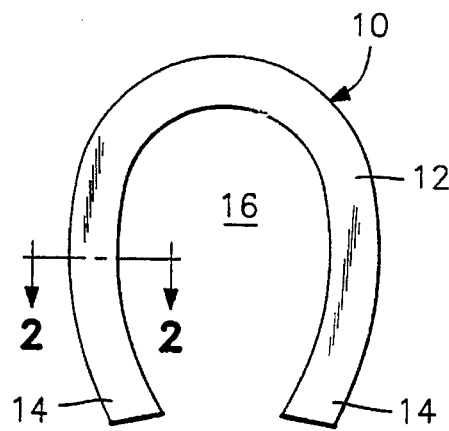
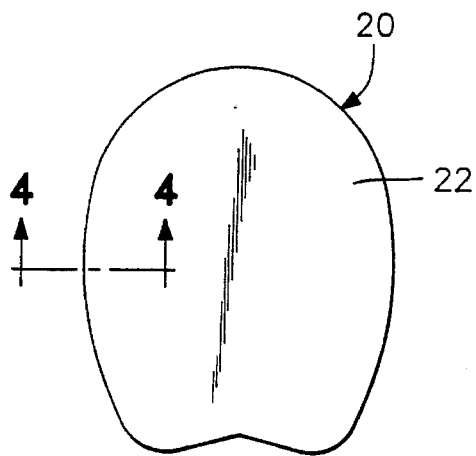
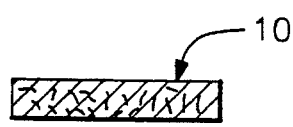
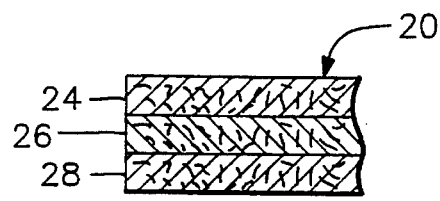
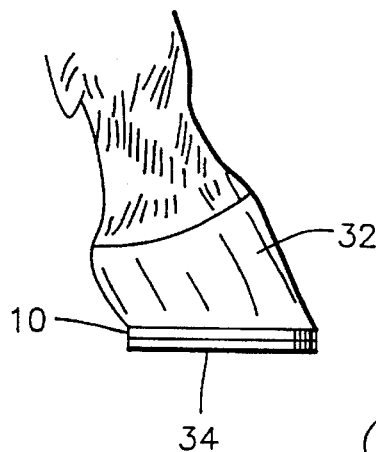
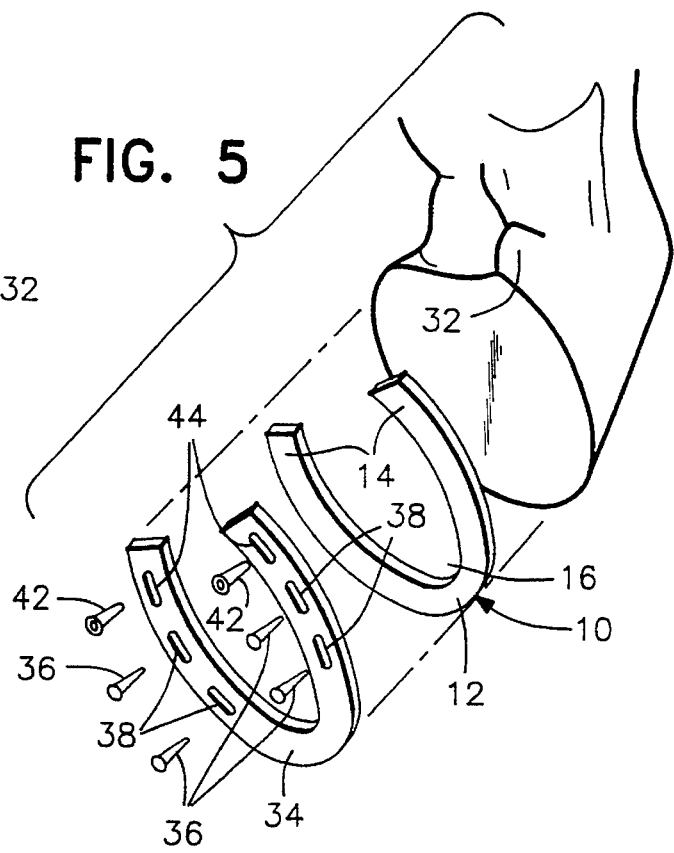

LEATHER-LIKE HOOF PAD OF COMPOSITE MATERIAL

BACKGROUND OF THE INVENTION

1. Field of the Invention

The invention relates to a pad of a composite material to be used with shoes for hoofed animals, especially horses. The hoof pad of this invention is leather-like in that it is breathable like leather, and has superior cushioning and shock absorbing characteristics compared to leather hoof pads; however, the composite hoof pad of the invention exhibits superior dimensional stability, maintains a proper balance of rigidity and flexibility during useful life and resistance to cracking and embrittlement, which attributes leather hoof pads lack.

2. Description of the Related Art

For many years, farriers have inserted pads of various shapes, sizes and materials between a horse's hoof and a horseshoe. The primary purposes for using such pads are: to protect the sole of the horses's hoof; to act as shock absorbers and reduce concussion when the horse's hoof and horseshoe strike the ground; to change the angle of the hoof relative to the ground; and to prevent snowballing.

Hoof pads are generally shaped to be secured, mechanically and/or chemically, between a horseshoe and at least the outer, peripheral portion of the horse's hoof. The two most common shapes of hoof pads are "full" pads and "rim" pads, although other shapes are possible. "Full," sometimes called "flat," pads cover the entire bottom surface of the horse's hoof and are used to protect the hoof and to keep it free of snow and debris. "Rim" pads fit between a horseshoe and the hoof, and are generally about the same size and shape as a horseshoe so that only the outer, peripheral portion of the hoof is covered. Rim pads are used to put more distance between the sole and the ground. Shock absorbing pads, which are used to reduce concussion and vibrations to the hoof and leg structures of the horse, have been made in both full and rim styles and have been made from a variety of materials.

The materials used in prior hoof pads include leather, rubber, polyurethane and other molded plastics, and woven and pressed felts. Leather was one of the first materials used for hoof pads, and leather hoof pads continue to enjoy popularity among farriers and horse owners. In many ways, leather hoof pads have been the standard against which other materials are measured. Leather hoof pads have good cushioning and shock absorbing characteristics. Leather is also "breathable," and permits gas and water vapor transmission throughout the product. This characteristic is particularly important because proper moisture balance around the hoof is essential to the healthy physiology of the hoof.

However, leather hoof pads suffer from a number of significant disadvantages including loss of cushioning and a lack of dimensional stability under compressive stress. Even though leather can absorb and desorb moisture, when leather is alternately wetted and dried, it changes shape. Thus, leather hoof pads subjected to wet conditions and/or compressive stress, which are inevitably encountered by most horses' hooves, will irreversibly change shape. Further, after being subjected to wet conditions, leather hoof pads can become brittle and hard and can crack upon drying.

To overcome the dimensional instability and structural deterioration problems of leather, hoof pads have been made from a variety of molded synthetic materials including rubber, polyurethane and plastics. Although these molded synthetic materials are more dimensionally stable and resistant to deterioration due to moisture than leather, molded synthetic hoof pads are gas and moisture impermeable and are not breathable. Molded rubber, polyurethane and plastic hoof pads trap moisture between the hoof and the hoof pad, which may lead to weakened hoof structure as well as provide an unhealthy breeding ground for bacteria, fungi and yeast. In addition, many molded synthetic hoof pads can be unyielding and inflexible, and can also transmit too much heat from the horseshoe to the hoof.

Woven and pressed felt materials, which are gas and moisture permeable, have been used for some specialized hoof pads but are extremely compressible, lack rigidity, and are generally unsuited for long term use or for use as full pads.

Accordingly, a need remains for a hoof pad having the leather-like qualities of breathability, cushioning and shock absorbency without the dimensional instability, lack of rigidity and other disadvantages of leather. The hoof pads of the present invention satisfy this need, as discussed hereinafter, in an ecologically advantageous way.

SUMMARY OF THE INVENTION

It is, therefore, an object of the present invention to provide a pad and method for protecting the hoof of an animal from concussive forces, which do not suffer from the disadvantages of known pads and methods.

It is a further object of the invention to provide a hoof pad made of a composite material having the breathability and cushioning characteristics of leather, without the undesirable dimensional instability, lack of rigidity and deterioration properties of leather.

Another object of the invention is to provide a hoof pad which is dimensionally stable under compressive stress.

Yet a further object of the invention is to provide a hoof pad which is gas and moisture permeable.

It is another object of the invention to provide a shock absorbing hoof pad made of a composite material.

Still a further object of the invention is to provide a hoof pad having a balance of stiffness and softness to provide good energy dissipation.

Yet another object of the invention is to provide a hoof pad which is water resistant and does not deteriorate, crack or become brittle and hard after being wetted.

A further object of the invention is to provide a hoof pad for use in the treatment of disorders of an animal's hoof and leg structures and for use in the prevention of disorders of an animal's hoof and leg structures.

It is another object of the invention to provide a hoof pad which is light- and heat-resistant, and which acts as an insulator to prevent transmission of heat from a metal shoe to an animal's hoof.

An additional object of the invention is to provide a hoof pad which is easily secured in position between an animals's hoof and shoe and which can be rasped to a desired size after being so secured.

An even further object of the invention is to provide a hoof pad made from renewable, recyclable and/or recycled components, which hoof pad itself can be recycled.

In accordance with the foregoing objects, this invention provides a pad and method for protecting and/or treating the hoof and leg structure of a hoofed animal. The hoof pad of the invention is adapted to be secured between the hoof of an animal and a metal shoe, and is made of a composite material having a substantially continuous web or matrix portion impregnated with a binder composition. The web portion of the composite hoof pad is primarily made of a particulate, matrix-forming material, preferably a natural or synthetic fibrous material. The web portion is impregnated with a binder composition, preferably a crosslinked natural or synthetic rubber latex, which imparts resiliency and water resistance to the composite material as well as binding the particulate, matrix-forming material in the web. The composite material for the hoof pad of the invention can be made by methods based on paper making processes, including, but not limited to, wet web impregnation, dry web impregnation, latex beater deposition and continuous latex wet-end deposition. The composite material is produced in the form of sheets or rolls, and the hoof pad is then cut from the roll or sheet of composite material. The hoof pad of composite material can be fixedly secured, by mechanical and/or chemical means, between the hoof of an animal and a metal shoe in a conventional manner.

The above and other objects, features and advantages of the invention will be further understood by reference to the following detailed description and drawings, wherein:

BRIEF DESCRIPTION OF THE DRAWINGS

FIG. 1 is a top plan view of a rim hoof pad produced in accordance with the present invention;

FIG. 2 is a cross-sectional view taken along lines II—II of FIG. 1;

FIG. 3 is a top plan view of a full hoof pad produced in accordance with the present invention;

FIG. 4 is a cross-sectional view taken along line IV—IV of FIG. 3;

FIG. 5 is an exploded perspective view of the rim hoof pad of FIG. 1 being mounted in position between the hoof of a horse and a horseshoe; and FIG. 6 is a side view of the rim hoof pad of FIG. 1 mounted in position between the hoof of a horse and a horseshoe.

DETAILED DESCRIPTION OF THE INVENTION

Referring now to the drawings, there are shown hoof pads in accordance with the invention as well as a method of using such hoof pads to protect the hoof of an animal from concussive forces. Although the invention will be described hereinafter with reference to horses, it is to be understood that the present invention is also applicable to other types of hoofed animals.

FIG. 1 shows a rim pad 10 made according to this invention. The rim pad 10 has a body portion 12 which has a shape substantially similar to that of a horseshoe. The body portion 12 has two legs 14 and an open area 16 therebetween so that a portion of the bottom surface of the horse's hoof is left uncovered. Preferably, the rim pad 10 is at least as large as and coextensive with the horseshoe with which it is to be used, in order to provide maximum cushioning and shock absorbing benefits for the hoof and leg structures of the horse.

FIG. 3 shows a full pad 20 made according to the present invention. Full pad 20 has a body portion 22 which has a peripheral portion with a shape substantially the same as that of a horseshoe. In contrast to the rim pad 10, the full pad 20 does not have a central opening and the body portion 22 covers the entire bottom surface of a horse's hoof.

Rim pad 10 and full pad 20 are two examples of hoof pad configurations which can be made in accordance with this invention. Other configurations of the hoof pad are possible and hereinafter the term "hoof pad" is intended to mean not only rim and full pads, but any pad having at least a peripheral portion shaped substantially the same as at least an arcuate portion of a horseshoe and being adapted to be secured between a horseshoe and a horse's hoof.

According to the invention, the hoof pad is made of a composite material having a substantially continuous web portion impregnated with a binder composition. The composite material is a matted, felted, non-woven sheet containing a web portion with web portion additives, and a binder composition with binder additives. The web portion and web portion additives preferably comprise from about 50% to about 90% by weight of the dry weight of the composite material, and more preferably comprise from about 65% to about 75% by weight of the dry weight of the composite material. The binder composition and binder additives preferably comprise from about 10% to about 50% by weight of the dry weight of the composite material, and more preferably comprise from about 25% to about 35% by weight of the dry weight of the composite material.

The web portion of the composite material includes at least one particulate, matrix-forming component. Examples of suitable particulate matrix-forming materials include: natural fibers including cellulosic fibers derived from a single source or a plurality of sources such as wood pulp, rags and cotton linters, and other cotton and vegetable fibers such as flax, hemp, abaca, jute, straw, ramie, sisal, istle, china grass, cotton grass, agave, pita, esparto, eucalyptus, evergreen and coniferous wood fibers, deciduous and broad-leaf hardwood fibers, comminuted and macerated waste fibers, viscose fibers, regenerated cellulose or cuprammonium type fibers, and rayon; synthetic fibers including polyolefins such as polyethylene, polypropylene and polybutylene, polyesters, nylons, acrylics, acetates, polyacrylonitriles, polycarbonates, triacetates, nytril, spandex, vinal and vinyon; wool fibers; glass fibers; mineral fibers; leather fibers; carbon fibers; ground cork; ground rubber; and mixtures thereof. Of these matrix-forming materials, natural fibers and/or synthetic fibers are preferred, with natural fibers being the more preferred. An especially preferred matrix-forming material is cellulosic fibers from one or more sources.

Preferably, the particulate matrix-forming component is a fibrous material having a denier of about 0.2 microns to about 40 microns and a fiber length of about 0.1 millimeter to about 20 millimeters.

The binder composition includes at least one natural or synthetic rubber latex. Examples of suitable synthetic rubber latices include resins such as styrene-butadiene, carboxylated styrene-butadiene, polyacrylic ester, polymethacrylic ester, copolymers of acrylic ester and methacrylic ester, acrylonitrile-acrylic ester copolymer, polyvinyl acetate, polyisobutylene, a copolymer of vinyl acetate and acrylic ester, polychloroprene, acrylonitrilebutadiene, carboxylated acrylonitrile butadiene, polyurethanes, a copolymer of ethylene and vinyl acetate, acrylonitrile butadiene styrene, polyvinylidene (di)chloride, carboxylated butadiene styrene vinylidene chloride terpolymers, polyisoprene (natural and synthetic) and other elastomeric co-, ter-, and multi-polymers. The binder composition may include a single natural or synthetic rubber latex or a mixture of two or more such rubber latices. An especially preferred binder composition comprises polychloroprene.

The binder composition imparts energy absorption and resiliency properties to the composite material, while maintaining the flexibility, durability and wear resistance of the composite material.

As noted above, both the web portion and the binder composition contain additives. These additives function as processing additives and/or end product additives to achieve certain desired results during the manufacture of the composite material and/or to impart certain desired characteristics to the hoof pad. Additives are classified as "web portion" additives and "binder" additives based on which component, the web forming component or the binder composition, the additive is initially mixed with. Thus, the same types of additives can be both web portion additives and binder additives.

The additives useful in the composite material are conventional additives, which are used for their known properties in preparing the composite material for the hoof pad of the invention. Examples of suitable web portion additives include antifungal agents, antimildew agents, antibacterial agents, dyes, pigments, dispersants, wet strength, web processing aids, defoamers and sizing agents. Examples of suitable binder additives include: surfactants, antioxidants, lubricants, crosslinking agents or catalysts, anti-ozonates, emulsifiers, wetting agents, colloidal stabilizing agents, vulcanizing agents, sizing agents, and defoamers.

The total amount of additives, both web portion and binder additives, in the composite material is preferably between about 0.5% and about 5.0% by weight based on the dry weight of the composite material.

In one embodiment of the invention, the hoof pad comprises a single ply or layer of the composite material as shown in FIG. 2. Both rim and full pads can be made of a single layer of composite material. Preferably, for use as a single ply hoof pad, the composite material has a thickness of between about 1/16 inch and about 3/16 inch. A thickness of less than about 1/16 inch may not provide adequate cushioning or shock absorption to protect the horse's hoof and leg structures.

The composite material is water resistant, yet gas and moisture permeable. Preferably, for use as a single ply hoof pad, the composite material has a water vapor transmission rate of between about 1.6 and about 2.0 mg/cm$^2$ per hour, as measured by SATRA insole material test procedure PM 47:1987. The composite material will both absorb and desorb water in both liquid and vapor forms, depending on both hoof and environmental conditions. The composite material has a liquid water absorption rate of between about 100 and about 150 mg/cm$^2$ over a 24 hour time period, as measured by SATRA insole test procedure PM 6:1980. The composite material has excellent dimensional stability characteristics when immersed in water, of between about 0.1 and about 0.3%, as measured by SATRA insole material test procedure PM 98:1992. The composite material exhibits a compression set under constant stress of between about 35 and about 50%, as measured by SATRA insole material test procedure PM 99:1981.

A second embodiment of the invention is shown in FIG. 4, wherein the hoof pad comprises multiple layers 24, 26, 28 of the composite material. In the embodiment of FIG. 4, the hoof pad is a full pad; however, it is to be understood that rim pads and other pad shapes may have multi-ply structures comprising two or more layers of the composite material. Individual layers of the composite material may be laminated or glued together by conventional means to make a multi-ply hoof pad according to the invention. Any number of layers or plies of the composite material may be used, depending upon the desired thickness, shock absorbency, cushioning and flexibility of the hoof pad. The multiply hoof pad of FIG. 4 can have a thickness of between about 1/8 inch and about 6 inches, depending upon the number of plies.

In another embodiment of the invention, the hoof pad comprises at least one layer of the composite material in combination with at least one layer of a different sheet material having at least one different physical characteristic. For example, the sheet material of the second layer may be differently colored, have different biocidal additives, have different flexibility characteristics, and/or have different performance characteristics such as improved cushioning or wear durability. Hoof pads comprising at least one layer of plain rubber sheet material or at least one layer of foamed polyurethane sheet material in combination with at least one layer of the composite material according to this invention will exhibit particularly advantageous and desirable properties. It is considered within the skill of a person skilled in this art to select and combine the different sheet materials in a hoof pad comprising a composite material according to the present invention to obtain specific physical characteristics.

The method of using the hoof pad according to the invention is generally shown in FIGS. 5 and 6. The hoof pad, for example rim pad 10, is positioned between the horse's hoof 32 and the horseshoe 34 and secured to the horse's hoof 32 by conventional nails 36 which pass through openings 38 in the horseshoe, through the hoof pad 10 and into the horse's hoof 32. The hoof pad 10 can be secured to the horseshoe 34 prior to securing the horseshoe 34 and hoof pad 10 to the hoof 32, either mechanically, such as by rivets 42 which extend through openings 44, and/or chemically, such as by adhesive. Any conventional means for securing a horseshoe and hoof pad to a horse's hoof can be used with the hoof pad according to this invention. FIG. 6 shows a side view of the hoof pad 10 securely mounted in position between the horseshoe 34 and hoof 32.

Composite materials of the type suitable for use in making the hoof pad of the present invention are commercially available. An especially suitable composite material is a matted, felted, non-woven polychloroprene impregnated cellulosic fibrous sheet sold under the trademark BONTEX® by Georgia Bonded Fibers, Inc. of Buena Vista, Va. However, for the sake of completeness, representative processes for making a composite material suitable for making a hoof pad of the invention are described below.

Composite materials for use in this invention can be made by modified paper-making processes wherein an aqueous slurry of the matrix-forming component and web portion additives is formed and then the slurry or a web formed from the slurry is impregnated with the binder composition and binder additives. The following modified paper-making processes in particular can be used to make the composite material for the hoof pads of this invention: wet web impregnation; dry web impregnation; latex beater deposition and continuous latex-wet-end deposition. Each of the processes will be described briefly below. Detailed examples of these types of processes can be found in U.S. Pat. No. 4,245,689 and those skilled in the art are believed to be familiar with such processes.

In the following discussion, the term "fibrous" is to be construed as including particulate matrix-forming materials which are not technically fibers. However, since the basic processes discussed herein are modified paper making processes, which do involve primarily cellulosic fibers as the web or matrix-forming component, the conventional term "fibrous" will be used.

In the wet web impregnation method, the fibrous matrix-forming component(s) and web portion additives are dispersed in water to prepare a slurry stock and the slurry stock passes through a refiner or beater which cuts the fibers and ruptures the surfaces of the fibers to improve their bondability. The refined slurry stock is fed to a sheet former of conventional construction. On the sheet former, a fibrous web is formed by removal of water from the approximately 99% by weight water content of the refined slurry stock feed to a fibrous web having about 72% by weight water. Following formation of the continuous fibrous web on the sheet former, it passes to a press section which removes water from the web to reduce the water content to about 50% to 60% by weight. The pressed web then passes to a saturator which introduces the binder composition and binder additives into the fibrous web. Excess binder composition and binder additives are removed from the fibrous web and then the binder impregnated fibrous web passes to dryers which dry the impregnated web to a moisture content less than 3% by weight. Subsequent conventional steps such as printing, coating, calendaring, laminating and the like can then be performed as desired.

The dry web impregnation is similar to the wet web impregnation method, with the exception that the fibrous web proceeds directly to the dryers from the press section to produce a dry, non-impregnated fibrous web. The fibrous web is subsequently impregnated with the binder composition and binder additives, in a separate production process, by passing the dry fibrous web through a bath of the binder composition and binder additives, removing excess binder composition and binder additives, and then drying the impregnated web to a moisture content less than 3% by weight.

In the latex beater deposition method, the binder composition and binder additives are mixed with the refined slurry stock in a latex deposition chest before the slurry stock is fed to the sheet former. A deposition agent or combination of agents is added to the latex deposition chest as well, to break the binder latex composition and deposit binder particles uniformly on the fibers. The binder composition and binder additives are mixed with the refined fiber slurry stock in a batchwise manner. The binder-containing slurry is then fed to the sheet former, press section, and dryers to produce the composite material. There is no additional binder composition deposited on the web after sheet forming in this process.

The continuous latex wet-end deposition method differs from the latex beater deposition method in that the binder composition and binder additives are introduced into the slurry stock, before the sheet former, continuously rather than in a batchwise manner. In this continuous method, all binder composition and binder additives are added to the slurry stock before the slurry is formed into a web by the sheet former, for example, at the inlet to a fan pump or in the headbox of the sheet former.

The above methods are examples of methods for making the composite material for the hoof pad of the invention, but should not be construed as the only suitable methods. The composite material made by the above methods is in the form of large, continuous sheets which can be cut and stacked or can be rolled around a supporting core. To make the hoof pad according to the invention, the composite material is cut to the desired hoof pad size and shape using any conventional cutting implements such as a rotary die, single beam press die, laser, high impact water jet, or a knife.

The invention will be further understood and appreciated from the following examples, which are intended to illustrate, not limit, the invention.

EXAMPLES

Four hoof pads were produced from composite materials having the dry weight compositions set forth below. The composite material can be generally described as a paperboard-like material, which has been cut to a full pad shape such as that shown in FIG. 3.

These examples of hoof pads were either about ⅛" or ¼" in thickness, representing both a single ply construction and a two ply lamination construction. The examples of the hoof pads were made according to the method generally described above and had the general characteristics detailed previously.

The following table describes the dry weight composition of samples "A" and "B", which are single ply composite materials.

| | Dry Weight Percent | |
|---|---|---|
| Ingredient Name | Sample A | Sample B |
| High alpha pulp | 34.96 | 35.28 |
| Bleached softwood | 20.77 | 20.96 |
| Pure alpha bulking pulp | 2.87 | 2.89 |
| Bleached softwood kraft | 5.42 | 5.48 |
| Polychloroprene | 21.85 | 17.17 |
| CSBR latex binder | 9.60 | 3.20 |
| High styrene content CSBR latex | 0.00 | 10.78 |
| Rubber accelerator | 0.35 | 0.35 |
| Wetting agent | 0.75 | 0.45 |
| Resin modifier | 0.00 | 0.21 |
| pH modifier | 0.00 | <0.01 |
| Polyquaternary amine chloride | 0.07 | 0.07 |
| Polyethylenimine | 0.04 | 0.04 |
| Paraffinic oil defoamer | <0.01 | <0.01 |
| Antioxidant | 0.24 | 0.24 |
| Sizing agent | 0.49 | 0.41 |
| Biocide | 0.08 | 0.08 |
| Polydimethylsiloxane | 1.64 | 1.65 |
| Total | 99+ | 99+ |

Physical characteristics for the single ply hoof pads of the above compositions are given in the following table:

| Property | Units | Method | Sample A | Sample B |
|---|---|---|---|---|
| Density | g/cm$^3$ | | 0.63 | 0.63 |
| Thickness | mm | TAPPI T411 | 3.0 | 2.9 |
| Basis Weight | g/m$^2$ | TAPPI T410 | 730 | 690 |
| Stiffness | | | | |
| MD[1] | g*cm | TAPPI T489 | 5000+ | 3275 |
| CD[2] | | | 3350 | 1750 |
| Tear Strength | | | | |
| MD | g | TAPPI T414 | 3200 | 3200 |
| CD | | | 4840 | 4540 |

[1]Machine direction
[2]Cross direction

The invention has been described with reference to preferred embodiments and specific examples thereof which are considered illustrative only of the principles of the invention. Since numerous changes and modifications will readily occur to those skilled in the art, it is not desired to limit the invention to the exact embodiments shown and described, and suitable modifications may be made without departing from the scope of the invention as described above and as defined in the appended claims.

What is claimed is:

1. A hoof pad adapted for attachment between the hoof of a horse and a horseshoe, comprising at least one layer of a composite material having a substantially continuous web portion impregnated with a binder composition, said web portion being made of a particulate, matrix-forming material and said binder composition being a material capable of binding the particulate, matrix-forming material in the web and imparting resiliency and water resistance to said composite material, said particulate, matrix-forming material being a fibrous material selected from the group consisting of natural cellulosic fibers, said web portion comprises about 50% to about 90% by weight of the dry weight of said composite material and said binder portion comprises about 10% to about 50% by weight of the dry weight of said composite material, said hoof pad being sized to fit between said hoof and said horseshoe and having at least a peripheral portion shaped substantially the same as at least an arcuate portion of said horseshoe and being adapted to be secured between said horseshoe and said hoof.

2. A hoof pad according to claim 1, wherein said web portion comprises a matted, felted, non-woven sheet material.

3. A hoof pad according to claim 1, wherein said web portion comprises at least one particulate, matrix-forming component selected from the group consisting of cellulosic fibers derived from wood pulp, rags and cotton linters, flax, hemp, abaca, jute, straw, ramie, sisal, istle, china grass, cotton grass, agave, pita, esparto, eucalyptus, evergreen and coniferous wood fibers, deciduous and broad-leaf hardwood fibers, comminuted and macerated waste fibers, viscose fibers, regenerated cellulose, cuprammonium type fibers, and rayon.

4. A hoof pad according to claim 1, wherein said fibrous material has a denier of about 0.2 microns to about 40 microns and a fiber length of about 0.1 millimeter to about 20 millimeters.

5. A hoof pad according to claim 1, wherein said binder composition comprises at least one member selected from the group consisting of natural and synthetic rubber latices.

6. A hoof pad according to claim 5, wherein said binder composition comprises at least one rubber latex selected from the group consisting of styrene-butadiene, carboxylated styrene-butadiene, polyacrylic ester, polymethacrylic ester, copolymers of acrylic ester and methacrylic ester, acrylonitrile-acrylic ester copolymer, polyvinyl acetate, polyisobutylene, a copolymer of vinyl acetate and acrylic ester, polychloroprene, acrylonitrilebutadiene, carboxylated acrylonitrile butadiene, polyurethanes, a copolymer of ethylene and vinyl acetate, acrylonitrile butadiene styrene, polyvinylidene (di)chloride, carboxylated butadiene styrene vinylidene chloride terpolymers, and polyisoprene.

7. A hoof pad according to claim 1, wherein said hoof pad comprises a single layer of said composite material.

8. A hoof pad according to claim 1, comprising at least two layers of said composite material, wherein said layers of composite material are laminated together.

9. A hoof pad according to claim 1, wherein said hoof pad is sized to be a full pad.

10. A hoof pad according to claim 1, wherein said hoof pad is sized to be a rim pad.

11. A hoof pad according to claim 1, wherein said composite material has a thickness of between about 1/16 inch and about 3/16 inch.

12. A hoof pad according to claim 1, wherein said web portion further comprises at least one web portion additive selected from the group consisting of antifungal agents, antimildew agents, antibacterial agents, dyes, pigments, dispersants, wet strength, web processing aids, defoamers and sizing agents, and said binder composition comprises at least one binder portion additive selected from the group consisting of surfactants, antioxidants, lubricants, crosslinking agents or catalysts, anti-ozonates, emulsifiers, wetting agents, colloidal stabilizing agents, vulcanizing agents, sizing agents, and defoamers.

13. A hoof pad according to claim 12, wherein the total combined amount of said web portion and binder additives is between about 0.5 % and about 5% by weight, based on the dry weight of said composite material.

* * * * *